United States Patent [19]

Ayoub et al.

[11] Patent Number: 4,527,758
[45] Date of Patent: Jul. 9, 1985

[54] DEPLOYMENT SEQUENCE MODE SELECTION SYSTEM FOR AIRCRAFT EJECTION SEAT

[75] Inventors: Peter Ayoub, Bryn Mawr; Alan Cantor, Ivyland, both of Pa.

[73] Assignee: The United States of America as represented by the Secretary of the Navy, Washington, D.C.

[21] Appl. No.: 531,097

[22] Filed: Sep. 12, 1983

[51] Int. Cl.³ .............................................. B64D 17/58
[52] U.S. Cl. ................................... 244/150; 244/149; 244/122 AE
[58] Field of Search ................. 244/122 AE, 122 AH, 244/150, 149, 122 AD, 138 R

[56] References Cited

U.S. PATENT DOCUMENTS

| | | | |
|---|---|---|---|
| 3,487,445 | 12/1969 | Gluhareff et al. | 244/122 AD |
| 3,530,868 | 9/1970 | Rickards | 244/122 AE |
| 3,547,383 | 12/1970 | Carpenter, Jr. | 244/150 |
| 3,592,419 | 7/1971 | Hantzsch | 244/122 AD |
| 3,667,705 | 6/1972 | Snyder | 244/150 |
| 3,669,388 | 6/1972 | VanKreuningen | 244/138 R |
| 3,862,731 | 1/1975 | McIntyre | 244/122 AE |
| 3,868,074 | 2/1975 | Hill | 244/177 |
| 3,873,050 | 3/1975 | Hill | 244/177 |
| 3,979,089 | 9/1976 | Miller et al. | 244/122 AD |
| 4,057,206 | 11/1977 | Duncan et al. | 244/122 AE |
| 4,216,928 | 8/1980 | Hooper et al. | 244/122 AD |
| 4,236,687 | 12/1980 | Stone et al. | 244/122 AD |

Primary Examiner—Trygve M. Blix
Assistant Examiner—Rodney Corl
Attorney, Agent, or Firm—Robert F. Beers; Henry Hansen; Vincent T. Pace

[57] ABSTRACT

An electronic system for selecting the proper mode sequence for deploying a recovery parachute from an aircraft ejection seat. The system senses altitude, airspeed, and sink rate; and compares these to predetermined reference signals. The system also incorporates logic circuits and time delay circuits. The logic circuits are arranged to select one of four time delays depending on the status of the various parameters relative to the reference signals.

5 Claims, 4 Drawing Figures

DEPLOYMENT SEQUENCE MODE SELECTION SYSTEM FOR AIRCRAFT EJECTION SEAT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to aircraft ejection seats and more particularly to a system for deploying an ejection seat recovery parachute in the most appropriate time sequence for a given set of conditions.

Ejection seat systems generally utilize only two basic parameters in determining the appropriate time sequence for parachute deployment: altitude and airspeed. U.S. Pat. Nos. 4,057,206 to Duncan et al and 3,669,388 to Van Kreuningen, exemplify the current systems.

Additionally, these systems usually have two modes of operation: a low mode and a high mode. The low mode becomes operative when the airspeed is below a certain value (e.g. 225 knots) and/or the altitude is less than a particular value (e.g. 6000 feet). This mode provides optimal timing to parachute extraction under these conditions. The high mode, on the other hand, becomes operative when the airspeed and altitude are greater than the predetermined values. The high mode delays deployment of the parachute by a fixed time period to allow aerodynamic retardation and a reduction in altitude.

The inventors have determined that under certain sink rate conditions a low speed mode provides the best recovery envelope. Under higher sink rate conditions, however, an intermediate mode provides the best recovery envelope. Thus, sink rate can have an effect in optimizing the deployment sequencing mode.

SUMMARY OF THE INVENTION

Accordingly, one object of this invention is to optimize the deployment sequencing of an ejection seat recovery parachute.

Another object of this invention is to select a proper timing sequence for initiating parachute deployment.

A further object of this invention is to utilize aircraft sink rate, as well as altitude and airspeed in selecting the proper timing sequence for initiating parachute deployment.

A still further object of this invention is to provide a parachute deployment system suitable for mounting on an aircraft ejection seat.

Another object of this invention is to provide a parachute deployment system suitable for use with existing condition sensors.

The above and other objects are realized in the present invention by means of electronic circuitry for comparing aircraft altitude, airspeed, and sink rate input signals to preset values. This circuitry in turn transmits a signal or signals to a plurality of electronic logic circuits. These logic circuits also receive enabling signals when seat ejection is initiated. The logic circuits select an appropriate time delay when a proper combination of the input and enabling signals are received. The time delay is accomplished by means of electronic time delay circuits each having a different pulse width. Also, electronic circuits are provided for locking out further sensor input signals once a time delay has been selected. An "open parachute" signal is generated when the trailing edge of the time delay pulse is detected.

Other objects, advantages, and novel features of the invention will become apparent from the detailed description of the invention which follows the accompanying drawings wherein:

DESCRIPTION OF THE PREFERRED EMBODIMENT

Figure 1:
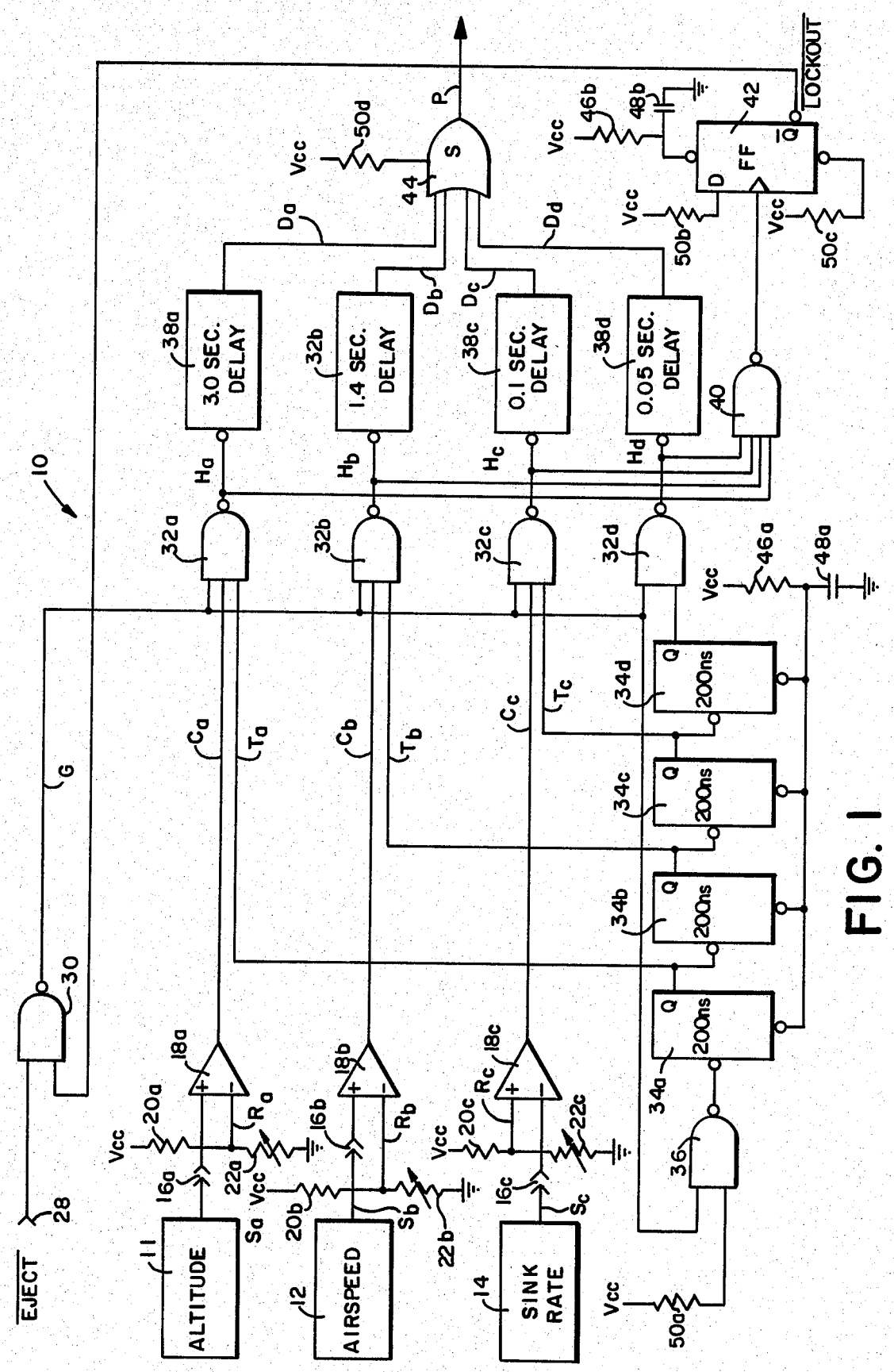
FIG. 1 is a schematic diagram of the mode selection system according to the present invention.

Referring now to the drawings, and in particular to FIG. 1, there is shown schematically a deployment sequence mode selection system, being the preferred embodiment of the present invention generally designated 10. The sequence mode selection system 10 includes an altitude sensor 11, an airspeed sensor 12, and a sink rate sensor 14. These sensors 11, 12 and 14 may be any of the conventional designs currently in use which provide a voltage signal that is proportional to the sensed parameter.

The sensors 11, 12 and 14 supply voltage signals $S_a$, $S_b$ and $S_c$ by means of disconnect devices 16a, 16b and 16c respectively to electronic comparators 18a, 18b and 18c respectively. Each comparator also receives a reference voltage signal $R_a$, $R_b$ or $R_c$ to which its sensor signal is compared. The reference signal may be provided by a device having means for adjusting the reference signal level. In FIG. 1 this is realized by voltage divider circuits having resistor pairs 20a and 22a, 20b and 22b, and 20c and 22c of which variable resistors 22a–c are calibrated to perform the desired comparisons and to match the sensor data that is provided.

Comparator 18a provides a signal $C_a$ when the altitude is greater than the reference signal $R_a$. Therefore, the altitude sensor 11 is connected to the positive (+) side of the comparator 18a, and the reference signal is connected to the negative (−) side. Likewise, comparator 18b provides a signal $C_b$ when the airspeed is greater than the reference signal $R_b$. Therefore, the airspeed sensor 12 is similarly connected to comparator 18b.

Comparator 18c, on the other hand, provides a signal $C_c$ when the sink rate is less than the reference signal $R_c$. Therefore, the sink rate sensor 14 is connected to the negative (−) side of the comparator 18c and the reference signal is connected to the positive (+) side.

Power is supplied to the mode selection system 10 from the aircraft. The power supply $V_{cc}$ will generally be about 5 volts, but this could vary depending on the nature of the components and the available power supply.

The balance of the mode selection system 10 comprises logic circuitry which is best described in terms of its operation. In this regard reference is also made to FIG. 2 which shows the timing sequence to be described.

Prior to the time when ejection is initiated by the pilot, $t_o$, the $\overline{\text{EJECT}}$ signal from the aircraft is in a logic high state. The $\overline{\text{EJECT}}$ signal is supplied to gate 30 by means of a connector 29. The $\overline{\text{LOCKOUT}}$ signal is also in a logic high state prior to $t_o$. Thus the gate 30, having NAND logic, is in a logic low state.

When an ejection is initiated, the $\overline{\text{EJECT}}$ signal arriving at gate 30 will be low and gate 30 will switch to a logic high. Thus a high signal G will be present at one of the inputs to each of gates 32a, 32b, 32c and 32d thereby enabling these gates. Also, a timing chain comprised of pulse generators 34a, 34b, 34c and 34d will be initiated through gate 36. In the embodiment shown in FIG. 1 the pulse generators 34a–d are realized by four one-shot multivibrators each having a pulse width of 200 nanoseconds. However, other types of devices may be utilized depending on the application and availability. Each of the pulse generators 34a–d provides sequentially a second enabling signal $T_a$, $T_b$, $T_c$ and $T_d$ to each of the gates 32a–d.

Each of the comparators 18a–c also supplies a data signal to each of the gates 32a–c. For example, when the voltage signal $S_a$, $S_b$ or $S_c$ from one of the sensors 11, 12 or 14 compares with the respective reference signal $R_a$, $R_b$ or $R_c$, a logic high is generated by the respective comparator 18a, 18b or 18c.

Figure 2:
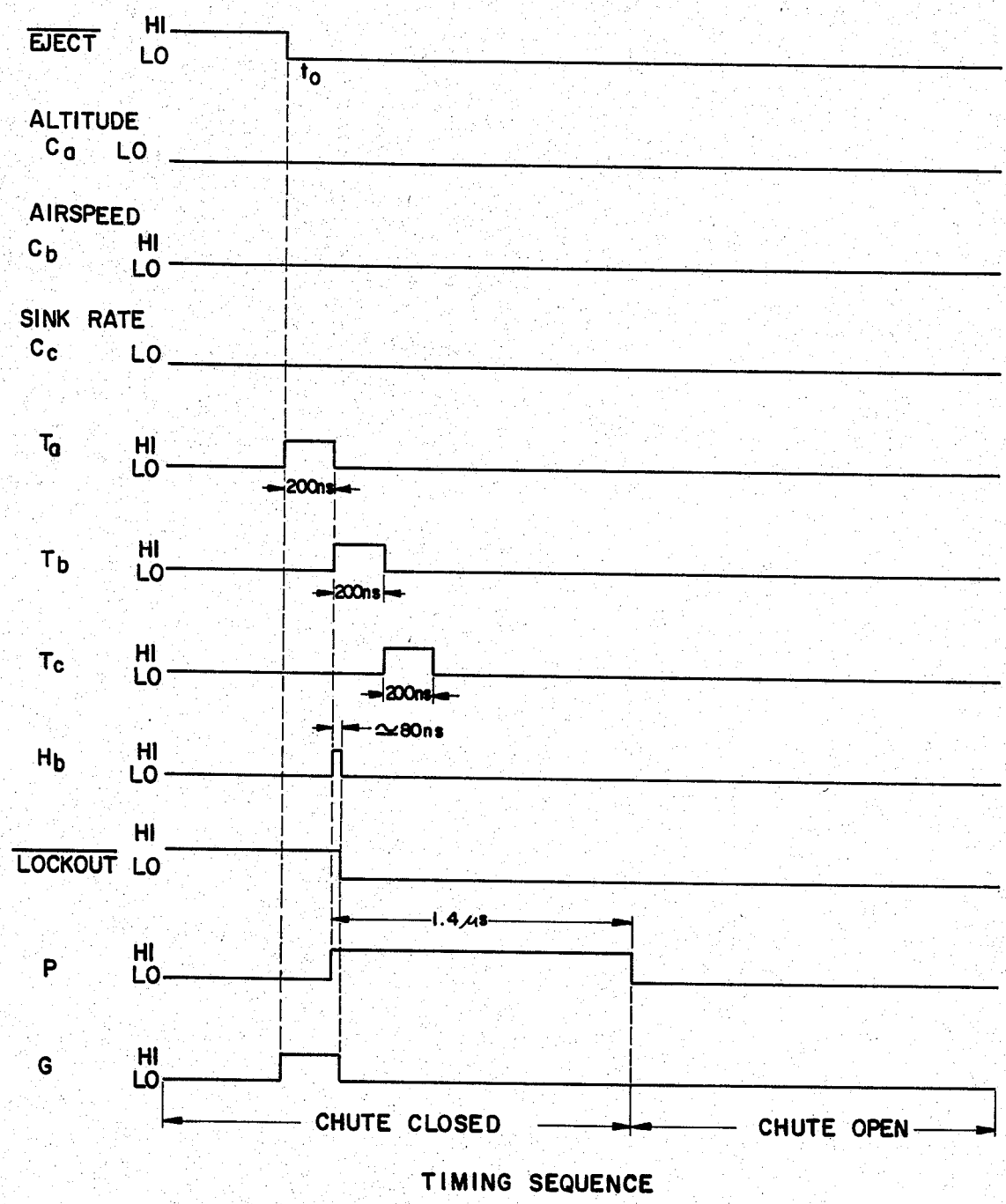
FIG. 2 is a timing sequence diagram illustrating operation of the mode selection system for one set of input parameters.

In the timing sequence shown in FIG. 2 an $\overline{\text{EJECT}}$ signal is received at $t_o$ and G, the signal from gate 30, goes high, enabling the system. At $t_o$ assume that the altitude is below the preset value (e.g. 6000 feet), but the airspeed is greater than the preset value (e.g. 225 knots). Thus $C_a$, the signal from comparator 18a will be in a logic low and $C_b$, the signal from comparator 18b will be in a logic high. Also at $t_o$, pulse generator 34a will begin its pulse $T_a$ and enable gate 32a.

For the duration of $T_a$, the altitude enabling pulse from pulse generator 34a, gate 32a is not entirely true since it has a system enable and an altitude enable, but the altitude is not greater than the preset value.

When pulse generator 34a times out, pulse generator 34b will begin its pulse $T_b$, enabling gate 32b. For the duration of this airspeed enabling pulse, gate 32b will be true since it has a system enable, an airspeed enable and $C_b$, the signal from the airspeed comparator 18b is in a logic high state. Therefore $H_b$, the signal from gate 32b will go to a logic low state and initiate the 1.4 second delay circuit 38b.

Also at this time the input signal to gate 40 from gate 32b will go to a low state making gate 40 not entirely true. Thus gate 40 will go high causing flip-flop circuit 42 to toggle and set its $\overline{Q}$ terminal to go low. This action causes a lockout of any further sensor input data by causing the enable signal of gate 30 to go low.

When a timing delay has been initiated (e.g. by delay circuit 38b), its pulse is transmitted to gate 44. The output pulse P delivered by gate 44 will initiate the parachute deployment by arming a ballistic device at the leading edge of the pulse, and firing said ballistic device at the trailing edge of the pulse.

Passive components of the system 10 include resistors 46a and 46b and capacitors 48a and 48b which are selected to provide initialization of power on. Resistors 50a, 50b, 50c and 50d are selected to provide steady state conditions. The logic circuits may be transistor-transistor logic (TTL) or large scale transistor-transistor logic (LSTTL).

Figure 3:
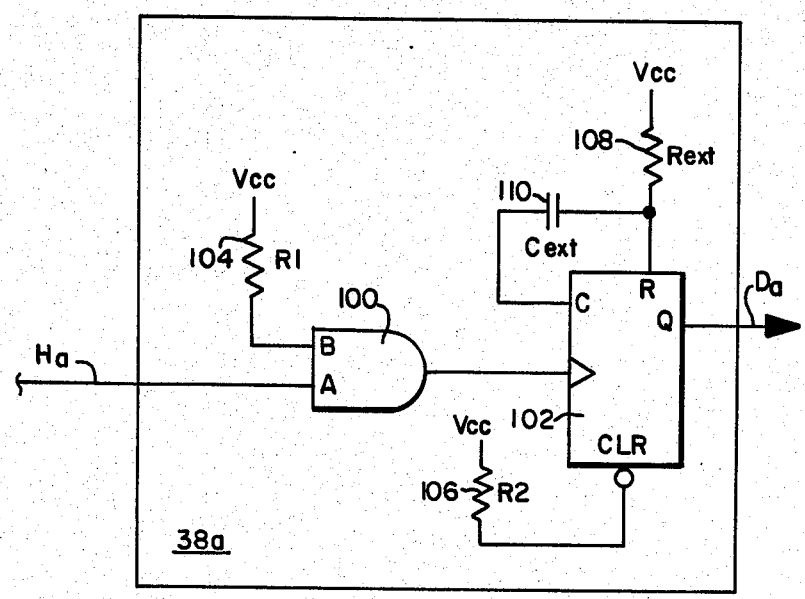
FIG. 3 is a circuit diagram of a typical time delay circuit which may be utilized in the mode selection system.

FIG. 3 illustrates time delay circuit 38a using a monostable multivibrator. Circuits 38b–d are similarly constructed, however, other circuit designs could be used. The time delay or pulse width $t_{w,\,out} \approx 0.7\, R_{ext} C_{ext}$. Thus resistor 108 and capacitor 110 are selected to obtain the desired pulse width. The time delay 102 is initiated upon receiving the appropriate signal from gate 100. Resistors 104 and 106 are selected to provide steady state conditions.

Referring back to FIG. 1 it is apparent now that the various time delays may be selected based on the various parameters at the time of ejection. Table I illustrates the various mode selections for a given set of parameters.

TABLE I

| t sec | A feet | V knots | $V_s$ ft/sec |
|---|---|---|---|
| 0.1 | <6000 | <225 | <300 |
| 1.4 | <6000 | >225 | — |
| 0.05–.1 | <6000 | <225 | >300 |
| 3.0 | >6000 | — | — |

The parameter t is the time delay selected for the various circuits 38a–d; A is the aircraft altitude; V, the airspeed; and $V_s$, the sink rate.

Figure 4:
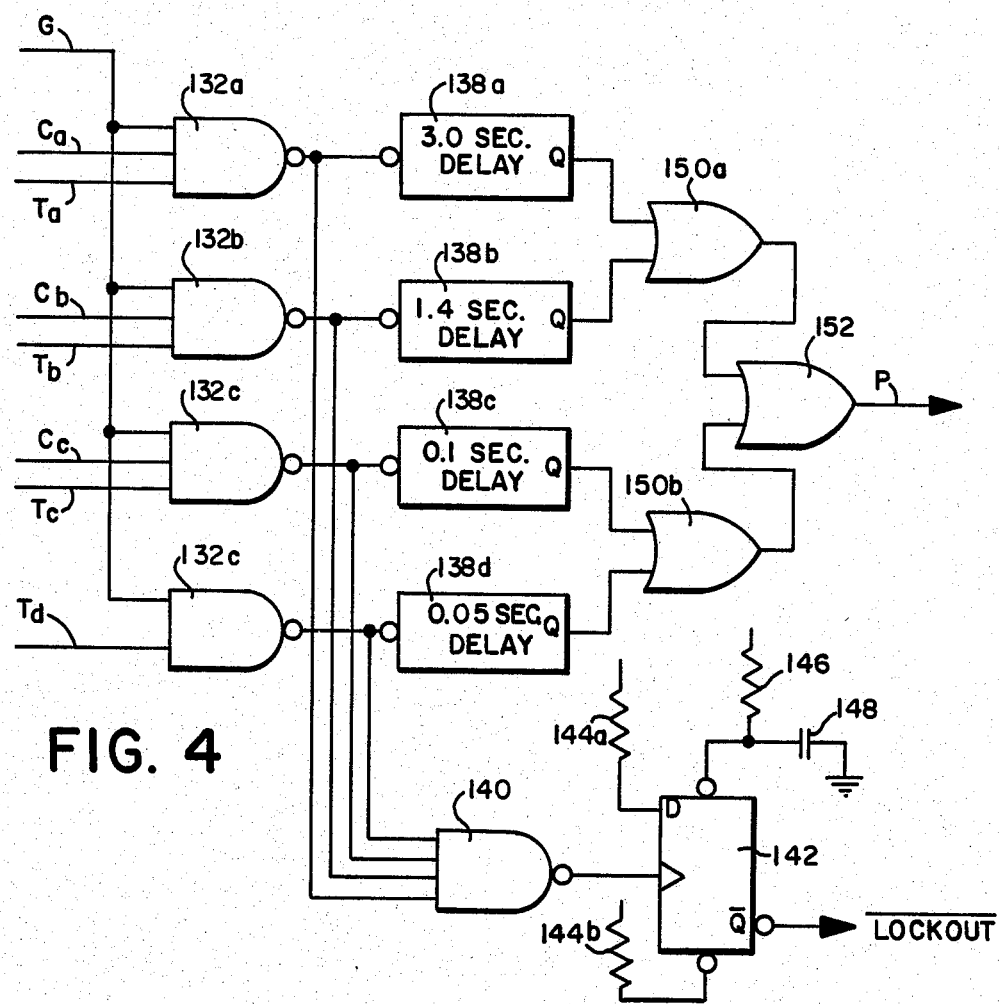
FIG. 4 is a schematic diagram of an alternative embodiment of the invention.

FIG. 4 illustrates an alternative embodiment of the subject invention. Gates 132a, 132b, 132c and 132d receive the enabling signals G, $T_a$–$T_d$ and comparator signals $C_a$–$C_c$ as before in order to select among the appropriate time delays 138a, 138b, 138c and 138d. However, in the embodiment of FIG. 4 intermediate gates 150a and 150b are provided which in turn trigger gate 152 to generate the $\overline{\text{OPEN PARACHUTE}}$ signal P.

Gate 140 operates as before to toggle flip-flop circuit 142 which then locks out further sensor data input. Resistors 144a and 144b are selected to provide steady state operation and resistor 146 and capacitor 148 are selected to provide initialization of power on.

The mode selection system of the subject invention would normally be mounted directly on the ejection seat since it would be very compact. The entire circuit could be mounted on one board as a microprocessor. The sensors may also be mounted on the ejection seat. However, since all of the sensed data is also available from the aircraft instrumentation, it can be obtained therefrom by means of a disconnectable cable.

In addition to the parameters described previously aircraft attitude (i.e. pitch and roll) may also be used in the mode selection processor. It has been determined that under essentially level aircraft attitude conditions (i.e. pitch and roll $< \pm 25°$), the low speed mode provides the best recovery enevelope. On the other hand, for steeper attitude (pitch and roll $> \pm 25°$) some intermediate mode provides the best recovery envelope. Thus, it can be seen that aircraft attitude has a similar effect on mode selection as sink rate. Therefore, aircraft attitude could be used as a fourth parameter or as an alternative to sink rate.

Some of the many advantages and new features of the subject invention should now be apparent in view of the foregoing description. For example, the selection of a proper timing sequence for initiating deployment of an ejection seat parachute may be rapidly accomplished. Moreover, the timing sequence may be determined on the basis of aircraft sink rate and/or attitude, as well as the conventional parameters, airspeed and altitude. Thus there is more flexibility in selecting a proper sequencing mode and the deployment sequence may be optimized for a given set of conditions. Finally, by utilizing microprocessor technology, the system described may be made compact enough to mount right on the ejection seat and may be connected directly to onboard sensors via a disconnectable cable.

Numerous modifications and variations of the subject invention are possible in light of the above teachings. It is therefore to be understood that within the scope of the appended claims the invention may be practiced otherwise than as specifically described.

What is claimed is:

1. A system for selecting the release time of a parachute after ejection from an aircraft comprising:

sensor means for producing sensor signals indicative of altitude, airspeed and sink rate of the aircraft immediately prior to ejection; and processor means responsive to said sensor signals for providing a parachute release signal a predetermined delay time after ejection, the time being selected in accordance with the following criteria:

$t_1$ to $t_2$ when $S_a < R_a$, $S_b < R_b$, and $S_c > R_c$, or $t_2$ when $S_a < R_a$, $S_b < R_b$, and $S_c < R_c$, or $t_3$ when $S_a < R_a$ and $S_b > R_b$, or $t_4$ when $S_a > R_a$, where $t_1$, $t_2$, $t_3$ and $t_4$ = delay times of respectively increasing durations, $S_a$, $S_b$ and $S_c$ = sensor signals indicative of the aircraft altitude, airspeed and sink rate, respectively, and $R_a$, $R_b$ and $R_c$ = minimum altitude, airspeed and sink rate, respectively, for optimium recovery envelopes.

2. A system according to claim 1 wherein said processor means further comprises:

comparator means receiving said sensor signals $S_a$, $S_b$ and $S_c$ and said reference signals $R_a$, $R_b$ and $R_c$ for producing comparative signals indicative of the relative magnitude of said sensed signals to said reference signals;

logic means receiving said comparative signals for producing a logic signal for a delay time corresponding to said criteria; and delay means responsive to said logic signal for providing a parachute release signal at the delay time after ejection.

3. A mode selection system for controlling the deployment of a parachute connected to a load ejected from an aircraft, said system comprising:

(A) first sensor means for generating a first sensor signal when the altitude of the aircraft just prior to ejection differs from a first reference signal;

(B) second sensor means for generating a second sensor signal when the airspeed of the aircraft just prior to ejection differs from a second reference signal;

(C) third sensor means for generating a third sensor signal when the sink rate of the aircraft just prior to ejection differs from a third reference signal; and (D) processor means responsive to said sensor signals for generating a deployment signal after one of a plurality of predetermined delay times from ejection, said processor means including:

(1) first enabling means for generating a system enable signal when ejection is initiated, (2) logic means for generating a logic signal in response to the sensor signals and the system enable signal, and said logic means including:

(a) second enabling means responsive to the system enable signal for providing a sequence of delayed enabling signals, said second enabling means including:

(i) gating means responsive to the system enable signal for providing an initiating signal, (ii) a first pulse generator responsive to the initiating signal for providing a first delayed enabling signal to the control means, (iii) a second pulse generator responsive to the first delayed enabling signal for providing a second delayed enabling signal to the control means, (iv) a third pulse generator responsive to the second delayed enabling signal for providing a third delayed enabling signal to the control means, and (v) a fourth pulse generator responsive to the third delayed enabling signal for providing a fourth delayed enabling signal to the control means, (b) control means for providing a control signal in response to a preselected combination of one of the sensor signals, the system enable signal, and one of the delayed enabling signals, and (c) delay means for providing the logic signal in response to the control signal; and (3) signal means for providing the deployment signal in response to the logic signal.

4. A mode selection system for controlling the deployment of a parachute connected to a load ejected from an aircraft, said system comprising:

(A) first sensor means for generating a first sensor signal when the altitude of the aircraft just prior to ejection differs from a first reference signal;

(B) second sensor means for generating a second sensor signal when the airspeed of the aircraft just prior to ejection differs from a second reference signal;

(C) third sensor means for generating a third sensor signal when the sink rate of the aircraft just prior to ejection differs from a third reference signal; and (D) processor means responsive to said sensor signals for generating a deployment signal after one of a plurality of predetermined delay times from ejection, said processor means including:

(1) first enabling means for generating a system enable signal when ejection is initiated, (2) logic means for generating a logic signal in response to the sensor signals and the system enable signal, said logic means including:

(a) second enabling means responsive to the system enable signal for providing a sequence of delayed enabling signals, (b) control means for providing a control signal in response to a preselected combination of one of the sensor signals, the system enable signal, and one of the delayed enabling signals, said control means including:

(i) first gate means for providing the control signal in response to the first sensor signal, system enable signal, and first delayed enabling signal, (ii) second gate means for providing the control signal in response to the second sensor signal, system enable signal, and second delayed enabling signal;

(iii) third gate means for providing the control signal in response to the third sensor signal, system enable signal, and third delayed enabling signal, (iv) fourth gate means for providing the control signal in response to the system enable signal and the fourth delayed enabling signal, and (v) said second, third, and fourth delayed enabling signals being progressively later than the first delayed enabling signal, and (c) delay means for providing the logic signal in response to the control signal;

(3) signal means for providing the deployment signal in response to the logic signal; and (4) locking means for inhibiting said first enabling means in response to the control signal.

5. A mode selection system as recited in claim 4 wherein the locking means further comprises:

a logic gate responsive to the control signal from the first, second, third, or fourth gate means for providing a trigger signal; and switching means responsive to the trigger signal for providing an inhibiting signal to the first enabling means, whereby the system enable signal is canceled.

* * * * *